(12) United States Patent
Ji

(10) Patent No.: US 11,362,885 B2
(45) Date of Patent: Jun. 14, 2022

(54) METHOD, APPARATUS, DEVICE AND READABLE MEDIUM FOR DISASTER RECOVERY PROCESSING FOR INFRASTRUCTURE AREAS

(71) Applicant: BEIJING BAIDU NETCOM SCIENCE AND TECHNOLOGY CO., LTD., Beijing (CN)

(72) Inventor: Zitong Ji, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/903,105

(22) Filed: Jun. 16, 2020

(65) Prior Publication Data

US 2021/0168024 A1 Jun. 3, 2021

(30) Foreign Application Priority Data

Nov. 29, 2019 (CN) .......................... 201911199543.X

(51) Int. Cl.
*H04L 41/0654* (2022.01)
*H04L 41/0631* (2022.01)
(Continued)

(52) U.S. Cl.
CPC ........ *H04L 41/0672* (2013.01); *H04L 41/065* (2013.01); *H04L 41/0668* (2013.01)

(58) Field of Classification Search
CPC ............. H04L 41/0672; H04L 41/0668; H04L 41/065; H04L 41/5019; H04L 41/0654; H04L 61/1511
See application file for complete search history.

(56) References Cited

U.S. PATENT DOCUMENTS 10,069,788 B1* 9/2018 Earl .................... H04L 61/1511
2007/0174461 A1* 7/2007 Reilly ................. H04L 67/1002
709/226

(Continued)

FOREIGN PATENT DOCUMENTS

CN 101227333 A 7/2008
CN 102724323 A 10/2012
(Continued)

*Primary Examiner* — John A Follansbee
*Assistant Examiner* — Kamal Hossain
(74) *Attorney, Agent, or Firm* — Brooks Kushman P.C.

(57) ABSTRACT

A method, an apparatus, a device and a readable medium for disaster recovery processing for infrastructure areas which relate to the technical field of infrastructure area management are disclosed. The method includes: receiving a request for the service; under the condition that a monitoring system detects that there is an identifier of a faulty infrastructure area in identifiers of at least two infrastructure areas having a binding relationship with the request for the service, unbinding the binding relationship between the identifier of the faulty infrastructure area and the service; scheduling traffic for the request for the service to an unfaulty infrastructure area, according to a remaining unbound binding relationship between the service and the identifier of the unfaulty infrastructure area. According to the technical solutions, the damages may be stopped in time when the fault occurs in the infrastructure area.

15 Claims, 6 Drawing Sheets

(51) Int. Cl.
*H04L 41/0668* (2022.01)
*H04L 41/5019* (2022.01)
*H04L 61/4511* (2022.01)

(56) References Cited

U.S. PATENT DOCUMENTS

2009/0144305 A1* 6/2009 Little ..................... H04L 67/10
2010/0218034 A1* 8/2010 Sirigiri ................ G06F 11/2048
714/4.12
2021/0089415 A1* 3/2021 Kumar ................ G06F 11/2038

FOREIGN PATENT DOCUMENTS

| CN | 105376305 A | 3/2016 |
| CN | 109471755 A | 3/2019 |
| CN | 109542645 A | 3/2019 |
| CN | 110069337 A | 7/2019 |
| CN | 110413457 A | 11/2019 |

* cited by examiner

METHOD, APPARATUS, DEVICE AND READABLE MEDIUM FOR DISASTER RECOVERY PROCESSING FOR INFRASTRUCTURE AREAS

CROSS-REFERENCE TO RELATED APPLICATIONS

The present application claims the priority of Chinese Patent Application No. 201911199543X, filed on Nov. 29, 2019. The disclosure of the above application is incorporated herein by reference in its entirety.

TECHNICAL FIELD

The present disclosure relates to computer application technologies, and particularly to the technical field of infrastructure area management, and more particularly to a method, an apparatus, a device and a readable medium for disaster recovery processing for infrastructure areas.

BACKGROUND

Construction of disaster recovery (DR) capability of the infrastructure area (or region or zone) involves in three dimensions. The first is construction of disaster recovery capability at an access layer, including domain parsing and IP service. The second is construction of disaster recovery capability at a service layer, including that of a service cluster itself. The third is construction of disaster recovery capability at the service-dependent layer, including services such as a database and a middleware. The existing construction of disaster recovery capability of the infrastructure area usually starts from the access layer, and a plurality of IPs bound to a same domain name are respectively associated with service instances of different infrastructure areas to implement 3-dimensional faulty domain isolation. The technical solution is relatively adapted to be applied at an initial stage of the construction of infrastructure areas.

However, the existing disaster recovery processing solutions are not flexible, and are difficult to implement in currently-existing service clusters and service architectures which are difficult to adjust.

SUMMARY

Embodiments of the present disclosure propose a method, an apparatus, a device and a readable medium for disaster recovery processing for infrastructure areas, which provide disaster recovery processing solutions with high flexibility.

According to some embodiments, a method for disaster recovery processing for infrastructure areas is provided, which includes: receiving a request for a service from an upper layer; under the condition that a monitoring system detects that there is an identifier of a faulty infrastructure area in identifiers of at least two infrastructure areas having a binding relationship with the request for the service, unbinding the binding relationship between the identifier of the faulty infrastructure area and the service; scheduling traffic for the request for the service to an unfaulty infrastructure area, according to a remaining unbound binding relationship between the service and the identifier of the unfaulty infrastructure area.

Optionally, in the abovementioned method, receiving the request for the service from the upper layer includes: receiving the request for the service including a domain name from the upper layer; where under the condition that the monitoring system detects that there is the identifier of the faulty infrastructure area in identifiers of the at least two infrastructure areas having the binding relationship with the request for the service, unbinding the binding relationship between the identifier of the faulty infrastructure area and the service includes: wider the condition that the monitoring system detects that there is an IP address of the faulty infrastructure area in IP addresses of the at least two infrastructure areas having the binding relationship with the domain name, unbinding the IP address of the faulty infrastructure area from the domain name, and retaining the binding relationship between the domain name and the IP address of the unfaulty infrastructure area in the IP addresses of the at least two infrastructure areas; and where scheduling the traffic for the request for the service to the unfaulty infrastructure area, according to the remaining unbound binding relationship between the service and the identifier of the unfaulty infrastructure area includes: scheduling the traffic for the request for the service corresponding to the domain name to the unfaulty infrastructure area, according to the remaining unbound binding relationship between the domain name and the IP address of the unfaulty infrastructure area.

Optionally, the abovementioned method may fluffier include: before receiving the request for the service from the upper layer, configuring IP addresses deployed at the at least two infrastructure areas for a same domain name, to bind the same domain name with the IP addresses deployed at the at least two infrastructure areas.

Optionally, in the abovementioned method, receiving the request for the service from the upper layer may include: receiving the request for the service including an IP address of an unfaulty infrastructure area from an upper layer; where under the condition that the monitoring system detects that there is the identifier of the faulty infrastructure area in identifiers of the at least two infrastructure areas having the binding relationship with the request for the service, unbinding the binding relationship between the identifier of the faulty infrastructure area and the service includes: under the condition that the monitoring system detects that there is a service instance deployed at a faulty infrastructure area in identifiers of a plurality of service instances having a binding relationship with the IP address, unbinding the identifier of the service instance deployed at the thrifty infrastructure area from the IP address, and retaining the binding relationship between the IP address and the identifier of the service instance deployed at the unfaulty infrastructure area; where the plurality of service instances are deployed at at least two infrastructure areas; and where scheduling the traffic for the request for the service to the unfaulty infrastructure area, according to the remaining unbound binding relationship between the service and the identifier of the unfaulty infrastructure area includes: scheduling the traffic for the request for the service to the service instance of the unfaulty infrastructure area, according to the remaining unbound binding relationship between the IP address and the identifier of the service instance deployed at the unfaulty infrastructure area.

Optionally, the abovementioned method may further include, before receiving the request for the service from the upper layer, configuring service instances of at least two infrastructure areas for each IP address, to bind the IP address to the identifiers of the service instances deployed at the at least two infrastructure areas.

Optionally, in the abovementioned method, the receiving a request for the service from an upper layer may include: receiving the request for the service including an identifier of a service instance from the upper layer; where under the condition that the monitoring system detects that there is the identifier of the faulty infrastructure area in identifiers of the at least two infrastructure areas having the binding relationship with the request for the service, unbinding the binding relationship between the identifier of the faulty infrastructure area and the service includes: under the condition that the monitoring system detects that there is a dependent service deployed at a faulty infrastructure area in identifiers of a plurality of dependent services having a binding relationship with the identifier of the service instance, unbinding the identifier of the dependent service deployed at the faulty infrastructure area from the identifier of the service instance, and retaining the binding relationship between the identifier of the service instance and an identifier of a dependent service deployed at an unfaulty infrastructure area; where the plurality of dependent services are deployed at at least two infrastructure areas; and where scheduling the traffic for the request for the service to the unfaulty infrastructure area, according to the remaining unbound binding relationship between the service and the identifier of the unfaulty infrastructure area includes: scheduling the traffic for the request for the service to the dependent service deployed at the unfaulty infrastructure area, according to a remaining unbound binding relationship between the identifier of the service instance and the identifier of the dependent service deployed at the unfaulty infrastructure area.

Optionally, the abovementioned method may further include: before receiving the request for the service from the upper layer, configuring dependent services of al least two infrastructure areas for each service instance, to bind the identifier of the service instance to the identifiers of the dependent services deployed at the at least two infrastructure areas.

According to some embodiments, an apparatus for disaster recovery processing for infrastructure areas is provided, which includes: a receiving module configured to receive a request for a service from an upper layer; an unbinding module configured to, under the condition that a monitoring system detects that there is an identifier of a faulty infrastructure area in identifiers of at least two infrastructure areas having a binding relationship with the request for the service, unbind the binding relationship between the identifier of the faulty infrastructure area and the service; a scheduling module configured to schedule traffic for the request for the service to an unfaulty infrastructure area, according to a remaining unbound binding relationship between the service and the identifier of the unfaulty infrastructure area.

According to some embodiments, an electronic device is provided which includes: at least one processor; and a memory communicatively connected with the at least one processor; wherein, the memory stores instructions executable by the at least one processor, and the instructions are executed by the at least one processor to enable the at least one processor to perform the method as described above.

According to some embodiments, a non-transitory computer-readable storage medium storing computer instructions therein is provided for causing the computer to perform the method as described above.

An embodiment of the present disclosure has the following advantages or effects: by the above technical solutions, it is possible to, when the monitoring system detects that there is an identifier of a faulty infrastructure area in identifiers of at least two infrastructure areas having a binding relationship with the request for the service, unbind the binding relationship between the identifier of the faulty infrastructure area and the service, and then schedule the traffic for the request for the service to an unfaulty infrastructure area, according to the remaining unbound binding relationship between the service and the identifier of the unfaulty infrastructure area, thereby stopping damages in time when the infrastructure area becomes faulty. Furthermore, the disaster recovery processing solution of the embodiment is flexible, easy to implement in the currently-existing service clusters and the service architectures which are difficult to adjust, and exhibit good utility.

Furthermore, it is further possible to, in the present disclosure, configure IP addresses deployed at the at least two infrastructure areas for the same domain name, to bind the domain name to the IP addresses deployed at the at least two infrastructure areas, and further perform the disaster recovery processing at the service access layer based on the binding relationship to facilitate stopping damages in time when the infrastructure area becomes faulty.

Furthermore, it is further possible to, in the present disclosure, configure service instances of at least two infrastructure areas for the IP addresses at the service instance layer, to bind the IP address to the identifiers of the service instances deployed at the at least two infrastructure areas, and further perform the disaster recovery processing at the service instance layer based on the binding relationship to facilitate stopping damages in time when the infrastructure area becomes faulty.

Furthermore, it is further possible to, in the present disclosure, configure dependent services of at least two infrastructure areas for respective service instances at the service-dependent layer, to bind the identifiers of the service instances to the identifiers of the dependent services deployed at the at least two infrastructure areas, and further perform the disaster recovery processing at the service-dependent layer based on the binding relationship to facilitate stopping damages in time when the infrastructure area becomes faulty.

Other effects of the technical solutions according to embodiments will be described hereinafter in conjunction with specific embodiments.

BRIEF DESCRIPTION OF THE DRAWINGS

The figures are intended to facilitate understanding the solutions, not to limit the present disclosure, in which.

DETAILED DESCRIPTION

Exemplary embodiments of the present disclosure will be described below with reference to the accompanying drawings. Various details of the embodiments of the present disclosure are included to facilitate understanding, which should be considered as merely exemplary. Therefore, those having ordinary skill in the art should recognize that various changes and modifications may be made to the embodiments described herein without departing from the scope and spirit of the application. Also, for the sake of clarity and conciseness, depictions of well-known functions and structures may be omitted in the following description.

Figure 1:
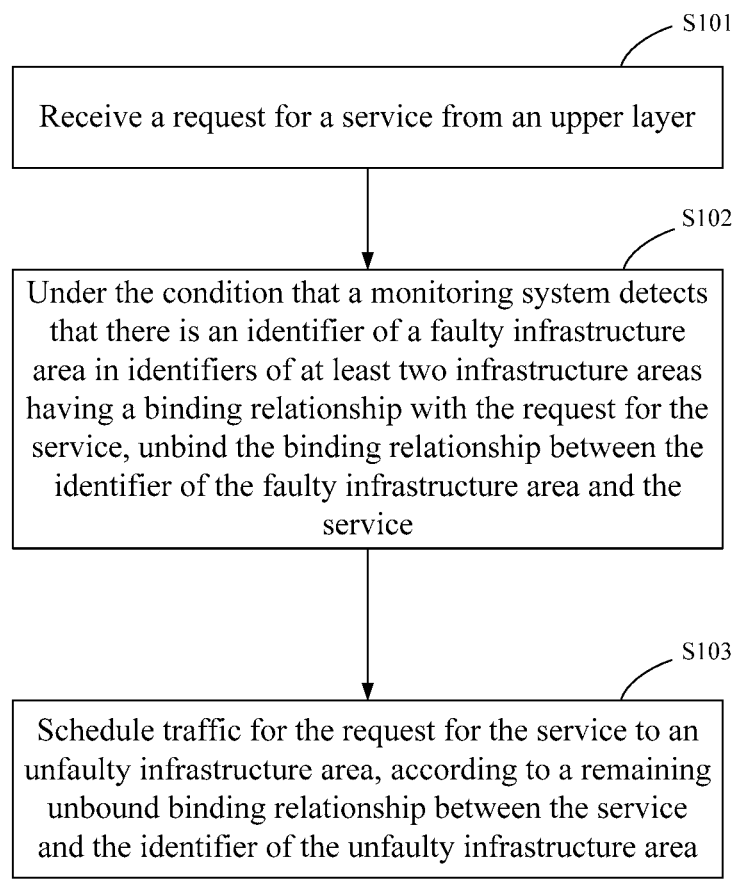
FIG. 1 is a flow chart of a method for disaster recovery processing according to an embodiment of the present disclosure.

FIG. 1 is a flow chart of a method for disaster recovery processing for infrastructure areas according to an embodiment of the present disclosure. As shown in FIG. 1, the method for disaster recovery processing for infrastructure areas according to the embodiment may specifically include the following steps:

S101: receiving a request for a service from an upper layer.

A subject for performing the method for disaster recovery processing for infrastructure areas according to this embodiment is an apparatus for disaster recovery processing for infrastructure areas. The apparatus may be an independent electronic entity or may also employ an application system integrated with software.

In practical applications, the infrastructure area in this embodiment may be a machine room or other facility areas covering a certain space and having certain hardware capabilities.

S102: under the condition that a monitoring system detects that there is an identifier of a faulty infrastructure area in identifiers of at least two infrastructure areas having a binding relationship with the request for the service, unbinding the binding relationship between the identifier of the faulty infrastructure area and the service.

S103: scheduling traffic for the request for the service to an unfaulty infrastructure area, according to a remaining unbound binding relationship between the service and the identifier of the unfaulty infrastructure area.

The apparatus for disaster recovery processing for infrastructure areas according to this embodiment is deployed in a processing procedure of the request for the service. For the request for the service from the upper layer, the apparatus for disaster recovery processing may monitor the infrastructure areas processing the request for the service, and perform disaster recovery processing in time when a certain infrastructure area is faulty (such as system breakdown, or system failure).

Specifically, the apparatus for disaster recovery processing for infrastructure areas according to this embodiment may communicate with the monitoring system. The monitoring system may be used to detect whether the infrastructure area is faulty. In an actual application scenario, a plurality of (or a large number of) infrastructure areas may be employed, and different infrastructure areas are respectively used to process different requests for the services. To ensure implementation of the disaster recovery processing in the infrastructure areas, in this embodiment, each request for the service may be bound to identifiers of at least two infrastructure areas. For example, the binding relationship between the request for the service and the identifiers of the at least two infrastructure areas is pre-stored in the apparatus for disaster recovery processing for infrastructure areas. For example, the binding relationship may be the identifier of the faulty infrastructure area and the identifier of the service corresponding to the request for the service. The identifier of the service in this embodiment may be an identifier for identifying the service, or may be a unique identifier included/carried in the request for service, or another identifier that can uniquely correspond to the service.

Upon detecting the faulty infrastructure area, the monitoring system sends the identifier of the faulty infrastructure area to the apparatus for disaster recovery processing for the infrastructure area, and the apparatus for disaster recovery processing determines whether the identifier of the faulty infrastructure area belongs to the identifiers of the infrastructure areas having the binding relationship with the request for the service, and if yes, unbinds the identifier of the faulty infrastructure area from the service. For example, the identifier of the faulty infrastructure area may be unbound from the identifier of the service. At this time, the binding relationship between the service and the identifier of the unfaulty infrastructure area in the at least two infrastructure areas still remain in the corresponding binding relationship.

Alternatively, in an embodiment, the binding relationship between the identifiers of services corresponding to the requests for the services and the identifiers of the infrastructure areas may also be pre-stored in the monitoring system. Upon detecting that there is a faulty infrastructure area in the at least two infrastructure areas corresponding to the request for the service, the monitoring system sends the identifier of the faulty infrastructure area to the apparatus for disaster recovery processing for the infrastructure area, and the apparatus unbinds the correspondence relationship between the identifier of the faulty infrastructure area and the service, and retains the correspondence relationship between the identifiers of the unfaulty infrastructure areas and the service.

Finally, the traffic for the request for the service is scheduled to the unfaulty infrastructure area according to the remaining unbound binding relationship between the service and the identifier of the unfaulty infrastructure area, so as to quickly schedule the traffic to the unfaulty infrastructure areas when an infrastructure area is faulty, and thereby achieve an effect of quickly stopping the damages.

By the above mentioned technical solution, the method for disaster recovery processing of the infrastructure area of this embodiment may, when the monitoring system detects that there is an identifier of a faulty infrastructure area identifiers of at least two infrastructure areas having a binding relationship with the request for the service, unbind the binding relationship between the identifier of the faulty infrastructure area and the service, and then schedule the traffic for the request for the service to an unfaulty infrastructure area, according to the remaining unbound binding relationship between the service and the identifier of the unfaulty infrastructure area, thereby stopping damages in time when the infrastructure area becomes faulty. The disaster recovery processing solution of this embodiment is flexible, easy to implement in the currently-existing service clusters and the service architectures which are difficult to adjust, and exhibit good utility.

Figure 2:
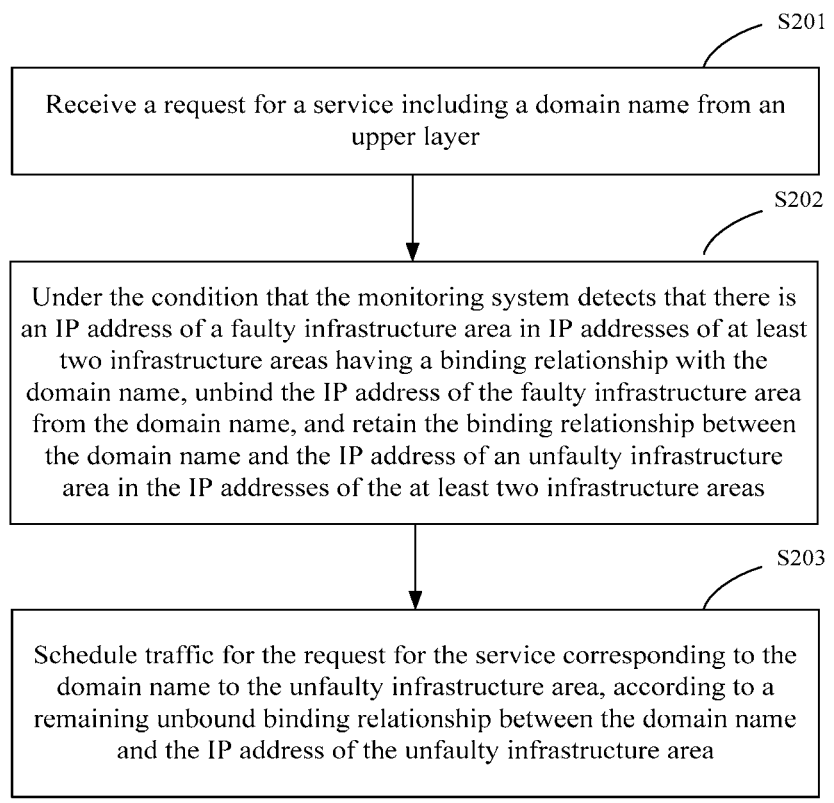
FIG. 2 is a flow chart of a method for disaster recovery processing according to an embodiment of the present disclosure.

FIG. 2 is a flow chart of a method for disaster recovery processing for infrastructure areas according to an embodiment of the present disclosure. As shown in FIG. 2, the technical solution of the method for disaster recovery processing for an infrastructure area according to this embodiment is described in detail at the service access layer. As shown in FIG. 2, the method for disaster recovery processing for infrastructure areas according to this embodiment may include steps as follows.

S201: receiving a request for a service including a domain name from an upper layer.

S202: under the condition that the monitoring system detects that there is an IP address of a faulty infrastructure area in IP addresses of at least two infrastructure areas having a binding relationship with the domain name, unbinding the IP address of the faulty infrastructure area from the domain name, and retaining the binding relationship between the domain name and the IP address of an unfaulty infrastructure area in the IP addresses of the at least two infrastructure areas.

Optionally, before the above step S201, the method may further include: configuring IP addresses deployed at the at least two infrastructure areas for a same domain name, to bind the same domain name with the IP addresses deployed at the at least two infrastructure areas.

S203: scheduling the traffic for the request for the service corresponding to the domain name to the unfaulty infrastructure area, according to a remaining unbound binding relationship between the domain name and the IP address of the unfaulty infrastructure area.

According to the technical solution of this embodiment, the disaster recovery processing for infrastructure areas may be implemented at the service access layer. Specifically, after an apparatus for disaster recovery processing for infrastructure areas receives the request for the service including the domain name from the upper layer, and when the monitoring system detects that there is an IP address of a faulty infrastructure area in IP addresses of at least two infrastructure areas having a binding relationship with the domain name, the apparatus may unbind the IP address of the faulty infrastructure area from the domain name, and only retains the binding relationship between the domain name and the IP addresses of the unfaulty infrastructure areas in the IP addresses of the al least two infrastructure areas, and thereby schedules the traffic for the request for the service corresponding to the domain name to the unfaulty infrastructure areas according to the binding relationship between the domain name and the IP addresses of the unfaulty infrastructure areas.

Likewise, according to the technical solution of this embodiment, the damages may be stopped in time when the fault/failure occurs in the infrastructure area. Furthermore, the disaster recovery processing solution of this embodiment is flexible, easy to implement in the currently-existing service clusters and the service architectures which are difficult to adjust, and exhibit good utility.

Figure 3:
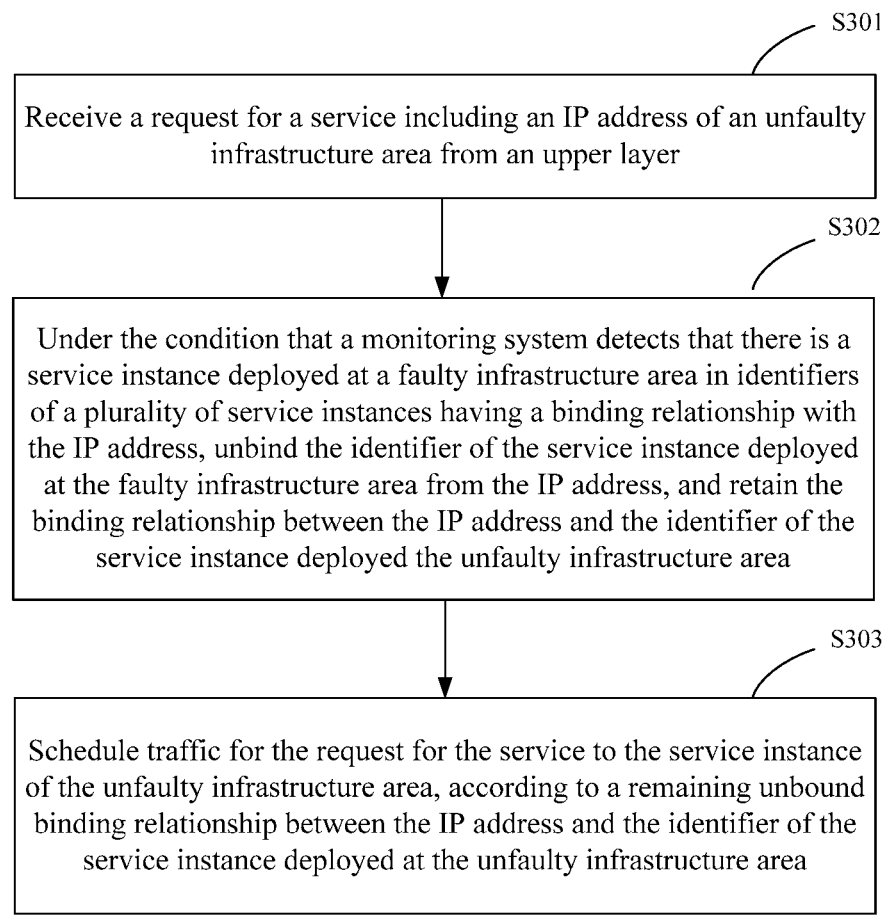
FIG. 3 is a flow chart of a method for disaster recovery processing according to an embodiment of the present disclosure.

FIG. 3 is a flow chart of a method for disaster recovery processing for infrastructure areas according to an embodiment of the present disclosure. As shown in FIG. 3, the technical solution of the method for disaster recovery processing for infrastructure areas according to this embodiment is described in detail at the service instance layer. As shown in FIG. 3, the method for disaster recovery processing for infrastructure areas according to this embodiment may include the following steps, S301: receiving a request for a service including an IP address of an unfaulty infrastructure area from an upper layer, S302: under the condition that a monitoring system detects that there is a service instance deployed at a faulty infrastructure area in identifiers of a plurality of service instances having a binding relationship with the IP address, unbinding the identifier of the service instance deployed at the faulty infrastructure area from the IP address, and retaining the binding relationship between the IP address and the identifier of the service instance deployed at the unfaulty infrastructure area; where the plurality of service instances are deployed at at least two infrastructure areas.

Optionally, before the above step S301, the method may further include: configuring service instances of at least two infrastructure areas for each IP address, to bind the IP address to the identifiers of the service instances deployed at the at least two infrastructure areas.

S303: scheduling the traffic for the request for the service to the service instance of the unfaulty infrastructure area, according to a remaining unbound binding relationship between the IP address and the identifier of the service instance deployed at the unfaulty infrastructure area.

According to the technical solution of this embodiment, the disaster recovery processing for infrastructure areas may be implemented at the service instance layer. Specifically, alter apparatus for disaster recovery processing for infrastructure areas receives the request for the service including the IP address of the unfaulty infrastructure area from the upper layer, and when the monitoring system detects that there is a service instance deployed at the faulty infrastructure area in identifiers of a plurality of service instances having the binding relationship with the IP address, the apparatus unbinds the identifier of the service instance of the faulty infrastructure area from the IP address, and retains the binding relationship between the IP address and the identifier of the service instance deployed at the unfaulty infrastructure area, and thereby schedules the traffic for the request for the service to the service instance on the unfaulty infrastructure area according to the remaining unbound binding relationship between the IP address and the identifier of the service instance deployed at the unfaulty infrastructure area.

Likewise, according to the technical solution of this embodiment, the damages may be stopped in time when the fault occurs in the infrastructure area. Furthermore, the disaster recovery processing solution of this embodiment is flexible, easy to implement in the currently-existing service clusters and the service architectures which are difficult to adjust, and exhibit good utility.

Figure 4:
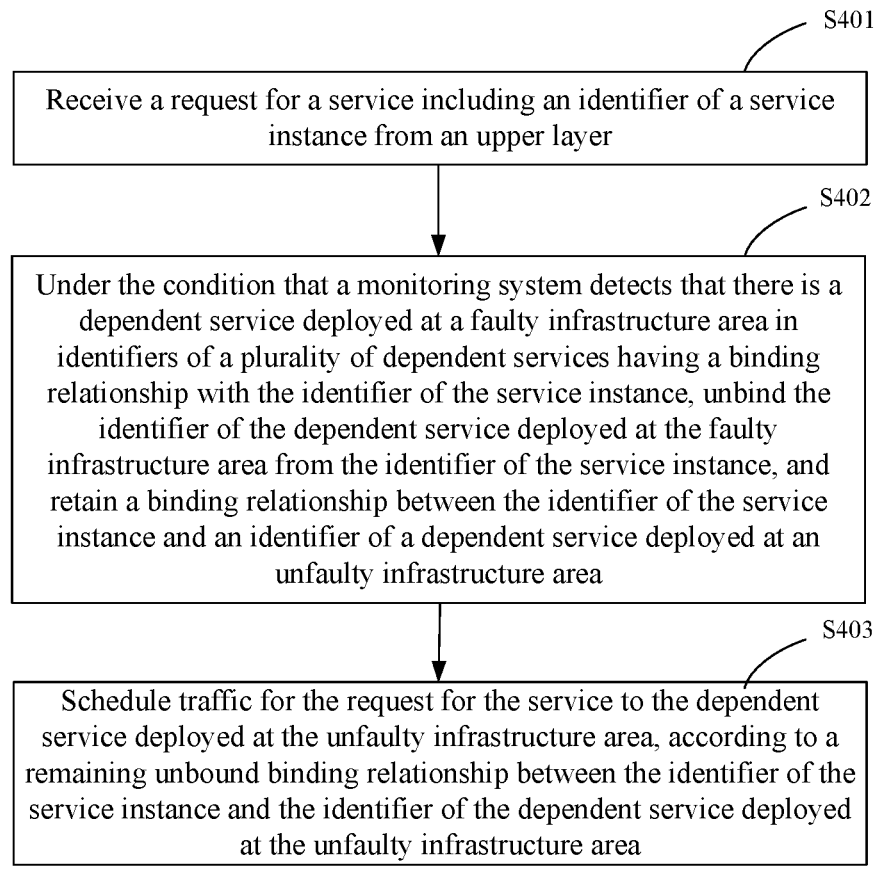
FIG. 4 is a flow chart of a method for disaster recovery processing according to an embodiment of the present disclosure.

FIG. 4 is a flow chart of an embodiment of a method for disaster recovery processing for infrastructure areas according to the present disclosure. As shown in FIG. 4, the technical solution of the method for disaster recovery processing for infrastructure areas according to the embodiment is described in detail at a service-dependent layer. As shown in FIG. 4, the method for disaster recovery processing for infrastructure areas according to the embodiment may specifically include the following steps, S401: receiving a request for a service including an identifier of a service instance from an upper layer, S402: under the condition that a monitoring system detects that there is a dependent service deployed at a faulty infrastructure area in identifiers of a plurality of dependent services having a binding relationship with the identifier of the service instance, unbinding the identifier of the dependent service deployed at the faulty infrastructure area from the identifier of the service instance, and retaining a binding relationship between the identifier of the service instance and an identifier of a dependent service deployed at an unfaulty infrastructure area; and where the plurality of dependent services are deployed at at least two infrastructure areas.

Optionally, before the above step S401, the method may further include: configuring dependent services of at least two infrastructure areas for each service instance, to bind the identifiers of the service instance to the identifiers of the dependent services deployed at the at least two infrastructure areas.

S403: scheduling traffic for the request for the service to the dependent service deployed at an unfaulty infrastructure area, according to a remaining unbound binding relationship between the identifier of the service instance and the identifier of the dependent service deployed at the unfaulty infrastructure area.

According to the technical solution of this embodiment, the disaster recovery processing of the infrastructure area may be implemented at the service-dependent layer. Specifically, alter apparatus for disaster recovery processing of the infrastructure area receives the request for the service including the identifier of the service instance from the upper layer, and when the monitoring system detects that there is a dependent service deployed at a faulty infrastructure area in identifiers of a plurality of dependent services having a binding relationship with the identifier of the service instance, the apparatus unbinds the identifier of the dependent service deployed at the faulty infrastructure area from the identifier of the service instance, and retains a binding relationship between the identifier of the service instance and an identifier of a dependent service deployed at an unfaulty infrastructure area, and then schedules traffic for the request for the service to the dependent service deployed at the unfaulty infrastructure area, according to the remaining unbound binding relationship between the identifier of the service instance and the identifier of the dependent service deployed at the unfaulty infrastructure area.

Likewise, according to the technical solution of this embodiment, the damages may be stopped in time when the fault occurs in the infrastructure area. Furthermore, the disaster recovery processing solution of this embodiment is flexible, easy to implement in the currently-existing service clusters and the service architectures which are difficult to adjust, and exhibit good utility.

Figure 5:
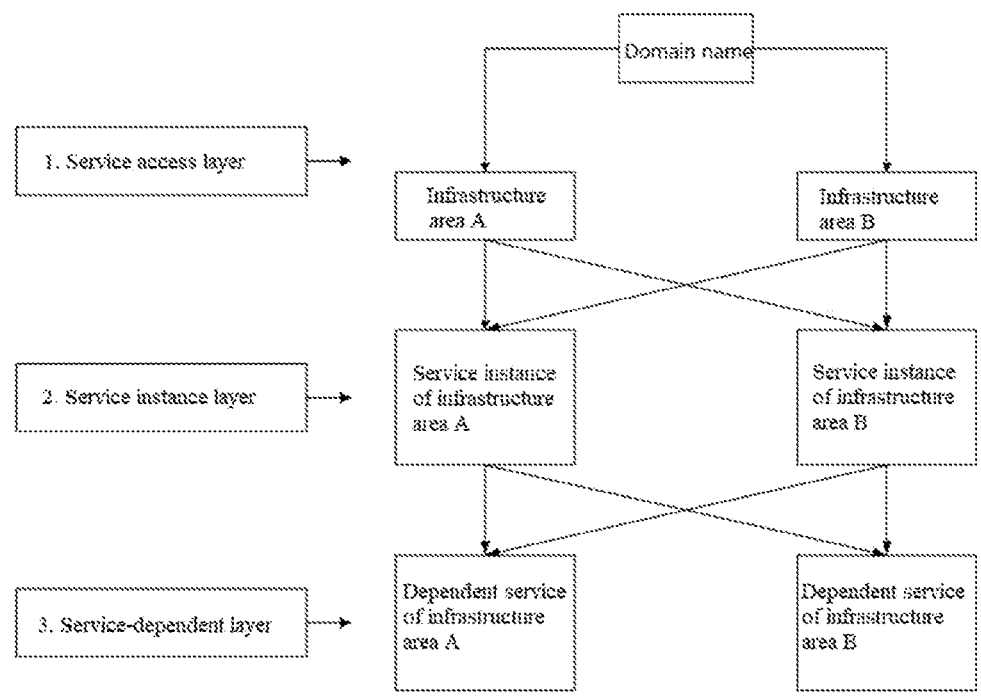
FIG. 5 illustrates an application scenario diagram according to an embodiment of the present disclosure.

FIG. 5 is an application scenario diagram of an embodiment of the method for disaster recovery processing for infrastructure areas according to the present disclosure. As shown in FIG. 5, an example is taken in which two infrastructure areas A and B are provided, and in which a service instance is deployed at the infrastructure area A, another service instance is deployed at the infrastructure area B, and a dependable service is deployed at the infrastructure area A, and another dependable service is deployed at the infrastructure area B.

Specifically, when a fault occurs at the infrastructure area A or B, the technical solution of the embodiment shown in the above FIG. 2 may be employed at the service access layer to implement the disaster recovery processing; the technical solution of the embodiment shown in the above FIG. 3 may be employed at the service instance layer to implement the disaster recovery processing; the technical solution of the embodiment shown in the above FIG. 4 may be employed at the service-dependent layer to implement the disaster recovery processing. For particulars, please refer to the technical solutions of the embodiments shown in the above FIG. 2-FIG. 4, which will not be detailed herein.

Figure 6:
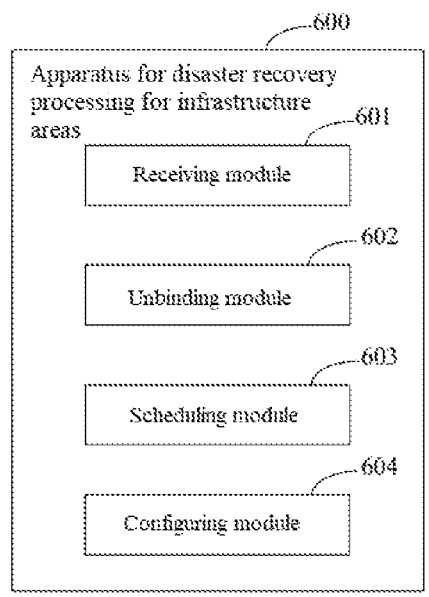
FIG. 6 is a schematic diagram of an apparatus according to an embodiment of the present disclosure.

FIG. 6 is a structural schematic diagram of an apparatus for disaster recovery processing for infrastructure areas according to an embodiment of the present disclosure. As shown in FIG. 6, the apparatus 600 for disaster recovery processing for infrastructure areas of this embodiment may specifically comprises: a receiving module 601 configured to receive a request for a service from an upper layer; an unbinding module 602 configured to, under the condition that a monitoring system detects that there is an identifier of a faulty infrastructure area in identifiers of at least two infrastructure areas having a binding relationship with the request for the service, unbind the binding relationship between the identifier of the faulty infrastructure area and the service; and a scheduling module 603 configured to schedule traffic for the request for the service to an unfaulty infrastructure area, according to a remaining unbound binding relationship between the service and the identifier of the unfaulty infrastructure area.

Optionally, in the apparatus 600 for disaster recovery processing for infrastructure areas of the embodiment: the receiving module 601 is specifically configured to receive the request for the service including a domain name from the upper layer; the unbinding module 602 is specifically configured to, under the condition that the monitoring, system detects that there is an IP address of the faulty infrastructure area in IP addresses of the at least two infrastructure areas having the binding relationship with the domain name, unbind the IP address of the faulty infrastructure area from the domain name, and retain the binding relationship between the domain name and the IP address of the unfaulty infrastructure area in the IP addresses of the at least two infrastructure areas; and the scheduling module 603 is specifically configured to schedule traffic for the request for the service corresponding to the domain name to the unfaulty infrastructure area, according to the remaining unbound binding relationship between the domain name and the IP address of the unfaulty infrastructure area.

Optionally, the apparatus 600 for disaster recovery processing for infrastructure areas of the embodiment may further include: a configuring module 604 configured to configure IP addresses deployed at the at least two infrastructure areas for a same domain name, to bind the same domain name with the IP addresses deployed at the at least two infrastructure areas.

Alternatively, the receiving module 601 is specifically configured to receive the request for the service including an IP address of an unfaulty infrastructure area from the upper layer; the unbinding module 602 is specifically configured to, under the condition that the monitoring system detects that there is a service instance deployed at a faulty infrastructure area in identifiers of a plurality of service instances having a binding relationship with the IP address, unbind the identifier of the service instance deployed at the faulty infrastructure area from the IP address, and retain the binding relationship between the IP address and the identifier of the service instance deployed at the unfaulty infrastructure area; where the plurality of service instances are deployed at at least two infrastructure areas; and wherein the scheduling module 603 is specifically configured to schedule traffic for the request for the service to the service instance of the unfaulty infrastructure area, according to the remaining unbound binding relationship between the IP address and the identifier of the service instance deployed at the unfaulty infrastructure area.

At this time, correspondingly, the configuring module 604 is further configured to configure service instances of at least two infrastructure areas for each IP address, to bind the IP address to the identifiers of the service instances deployed at the at least two infrastructure areas.

Alternatively, the receiving module 601 is specifically configured to receive the request for the service including an identifier off service instance from the upper layer; the unbinding module 602 is specifically to, under the condition that the monitoring system detects that there is a dependent service deployed at a faulty infrastructure area in identifiers of a plurality of dependent services having a binding relationship with the identifier of the service instance, unbind the identifier of the dependent service deployed at the faulty infrastructure area from the identifier of the service instance, and retain the binding relationship between the identifier of the service instance and an identifier of a dependent service deployed at an unfaulty infrastructure area; where the plurality of dependent services are deployed at at least two infrastructure areas; and the scheduling module 603 is specifically configured to schedule the traffic for the request for the service to the dependent service deployed at an unfaulty infrastructure area, according to a remaining unbound binding relationship between the identifier of the service instance and the identifier of the dependent service deployed at the unfaulty infrastructure area.

At this time, correspondingly, the configuring module 604 is further configured to configure dependent services of at least two infrastructure areas for each service instance, to bind the identifier of the service instance to the identifiers of the dependent services deployed at the at least two infrastructure areas.

The principle and technical effect of the apparatus 600 for the disaster recovery processing of the infrastructure area according to this embodiment in implementing the disaster recovery processing of the infrastructure area are the same as those of the above relevant method embodiments. For particulars, please refer to the disclosure of the above relevant method embodiments, which will not be detailed herein.

According to some embodiments of the present disclosure, the present disclosure further provides an electronic device and a readable storage medium.

Figure 7:
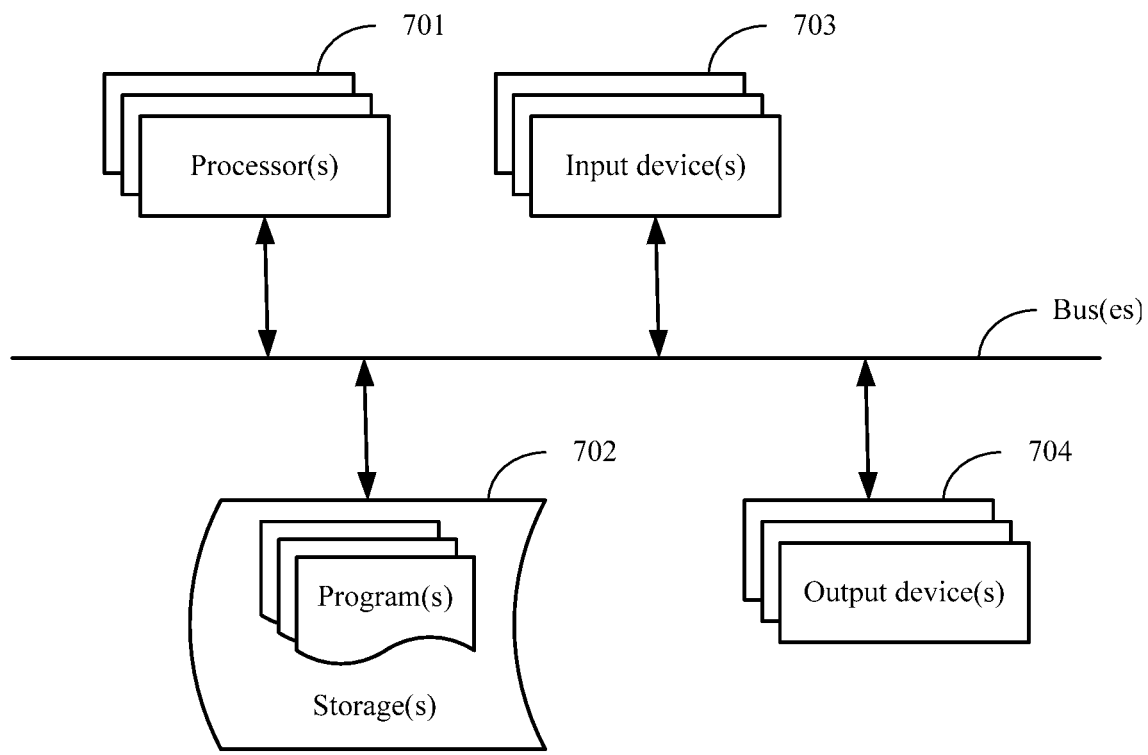
FIG. 7 is a block diagram of an electronic device for implementing a method for disaster recovery processing according to embodiments of the present disclosure.

As shown in FIG. 7, it shows a schematic diagram of an electronic device for implementing the disaster recovery processing for infrastructure areas according to some embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 7, the electronic device may include: one or more processors 701, a storage 702, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in a memory or on the storage device to display graphical information for a GUI on an external input/output device, such as display coupled to the interface. In other implementations, multiple processors and/or multiple buses may be used, as appropriate, along with multiple storages and types of storages. Also, multiple electronic devices may be connected, with each device providing portions of the necessary operations (e.g., as a server bank, a group of blade servers, or a multi-processor system). One processor 701 is taken as an example in FIG. 7.

The storage 702 is a non-transitory computer-readable storage medium provided by the present disclosure. Wherein, the storage stores instructions executable by at least one processor, so that the at least one processor executes the method for disaster recovery processing of the infrastructure area according to the present disclosure. The non-transitory computer-readable storage medium of the present disclosure stores computer instructions, which are used to cause a computer to execute the method for disaster recovery processing of the infrastructure area according to the present disclosure.

The storage 702 is a non-transitory computer-readable storage medium and can be used to store non-transitory software programs, non-transitory computer executable programs and modules, such as program instructions/units corresponding to the method for disaster recovery processing of the infrastructure area according to the present disclosure (for example, relevant modules as shown in FIG. 6). The processor 701 executes various functional applications and data processing of the server, i.e., implements the method for disaster recovery processing of the infrastructure area stated in the above method embodiments, by running the non-transitory software programs, instructions and modules stored in the storage 702.

The storage 702 may include a storage program region and a storage data region, wherein the storage program region may store an operating system and an application program needed by at least one function; the storage data region may store data created according to the use of the electronic device for implementing the method for disaster recovery processing of the infrastructure area. In addition, the storage 702 may include a high-speed random access memory, and may also include a non-transitory memory, such as at least one magnetic disk storage device, a flash memory device, or other non-transitory solid-state storage device. In some embodiments, the storage 702 may optionally include a storage remotely arranged relative to the processor 701, and these remote memories may be connected to the electronic device for implementing the method for disaster recovery processing of the infrastructure area through a network. Examples of the above network include, but are not limited to, the Internet, an intranet, a local area network, a mobile communication network, and combinations thereof.

The electronic device for implementing the processing method of the semantic representation model may timber include an input device 703 and an output device 704. The processor 701, the storage 702, the input device 703 and the output device 704 may be connected through a bus or in other manners. In FIG. 7, the connection through the bus is taken as an example.

The input device 703 may receive inputted numeric or character information and generate key signal inputs related to user settings and function control of the electronic device for the method for disaster recovery processing of the infrastructure area and may be an input device such as a touch screen, keypad, mouse, trackpad, touchpad, pointing stick, one or more mouse buttons, trackball and joystick. The output device 74 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

According technical solutions of embodiments of the present disclosure, through the above technical solutions, it is possible to, when the monitoring system detects that there is an identifier of a faulty infrastructure area in identifiers of at least two infrastructure areas having a binding relationship with the request for the service, unbind the binding relationship between the identifier of the faulty infrastructure area and the service, and then schedule traffic for the request for the service to an unfaulty infrastructure area, according to the remaining unbound binding relationship between the service and the identifier of the unfaulty infrastructure area, thereby stopping damages in time when the infrastructure area becomes faulty. Furthermore, the disaster recovery processing solution of this embodiment is flexible, easy to implement in the currently-existing service clusters and the service architectures which are difficult to adjust, and exhibit good utility.

According to the technical solutions of this embodiment, it is possible to configure IP addresses deployed at the at least two infrastructure areas for the same domain name, to bind the domain name to the IP addresses deployed at the at least two infrastructure areas, and further perform the disaster recovery processing at the service access layer based on the binding relationship to facilitate stopping damages in time when the infrastructure area becomes faulty.

According to the technical solutions of this embodiment, it is possible to configure service instances of at least two infrastructure areas for the IP addresses at the service instance layer, to bind the IP address to the identifiers of the service instances deployed at the at least two infrastructure areas, and further perform the disaster recovery processing at the service instance layer based on the binding relationship to facilitate stopping damages in time when the infrastructure area becomes faulty.

According to the technical solutions of this embodiment, it is possible to configure dependent services of at least two infrastructure areas for respective service instances at the service-dependent layer, to bind the identifiers of the service instances to the identifiers of the dependent services deployed at the at least two infrastructure areas, and further perform the disaster recovery processing at the service-dependent layer based on the binding relationship to facilitate stopping damages in time when the infrastructure area becomes faulty.

It should be understood that the various forms of processes shown above may be used to reorder, add, or delete steps. For example, the steps described in the present disclosure may be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for disaster recovery processing for infrastructure areas, comprising:
receiving a request for a service;
obtaining a domain name from the request for the service, wherein the domain name has binding relationships with a plurality of IP addresses, and wherein the plurality of IP addresses each has binding relationships with at least two service instances respectively deployed at at least two infrastructure areas, and the at least two service instances each has binding relationships with at least two IP addresses of the plurality of IP addresses;
under the condition that the monitoring system detects that there is a disabled IP address in the plurality of IP addresses, unbinding the disabled IP address from the domain name; and
scheduling the traffic for the request to remaining IP address or addresses except for the disabled IP address,
obtaining an identifier of a service instance from the request for the service, wherein the service instance has binding relationships with at least two dependent services respectively corresponding to at least two infrastructure areas;

under the condition that the monitoring system detects that there is a dependent service of the at least two dependent services deployed at a faulty infrastructure area of the at least two infrastructure areas, unbinding the dependent service deployed at the faulty infrastructure area from the service instance; and scheduling the traffic for the request for the service to the dependent service of the at least two dependent services deployed at an unfaulty infrastructure area of the at least two infrastructure areas, according to the binding relationship between the service instance and the dependent service deployed at the unfaulty infrastructure area.

2. The method according to claim 1, further comprising:
before receiving the request for the service,
configuring IP addresses deployed at the at least two infrastructure areas for a same domain name, to bind the same domain name with the IP addresses deployed at the at least two infrastructure areas.

3. The method according to claim 1, further comprising:
before receiving the request for the service,
configuring service instances of at least two infrastructure areas for each IP address, to bind the IP address to the identifiers of the service instances deployed at the at least two infrastructure areas.

4. The method according to claim 1, further comprising:
before receiving the request for the service,
configuring dependent services of at least two infrastructure areas for each service instance, to bind the identifier of the service instance to the identifiers of the dependent services deployed at the at least two infrastructure areas.

5. The method of claim 1, further comprising:
under the condition that a monitoring system detects that there is a service instance of the at least two service instances deployed at a faulty infrastructure area of the at least two infrastructure areas, unbinding the binding relationship between the IP addresses and the service instance deployed at the faulty infrastructure area; and scheduling traffic for the request for the service to a service instance of the at least two service instances deployed at an unfaulty infrastructure area of the at least two infrastructure areas, according to the binding relationship between the IP addresses and the service instance deployed at the unfaulty infrastructure area.

6. An electronic device, comprising:
at least one processor; and
a storage communicatively connected with the at least one processor; wherein,
the storage stores instructions executable by the at least one processor, and the instructions are executed by the at least one processor to enable the at least one processor to perform a method for disaster recovery processing for infrastructure areas, which comprises:
receiving a request for a service;
obtaining a domain name from the request for the service, wherein the domain name has binding relationships with a plurality of IP addresses, and wherein the plurality of IP addresses each has binding relationships with at least two service instances respectively deployed at at least two infrastructure areas, and the at least two service instances each has binding relationships with at least two IP addresses of the plurality of IP addresses;

under the condition that the monitoring system detects that there is a disabled IP address in the plurality of IP addresses, unbinding the disabled IP address from the domain name; and scheduling the traffic for the request to remaining IP address or addresses except for the disabled IP address, obtaining an identifier of a service instance from the request for the service, wherein the service instance has binding relationships with at least two dependent services respectively corresponding to at least two infrastructure areas;

under the condition that the monitoring system detects that there is a dependent service of the at least two dependent services deployed at a faulty infrastructure area of the at least two infrastructure areas, unbinding the dependent service deployed at the faulty infrastructure area from the service instance; and scheduling the traffic for the request for the service to the dependent service of the at least two dependent services deployed at an unfaulty infrastructure area of the at least two infrastructure areas, according to the binding relationship between the service instance and the dependent service deployed at the unfaulty infrastructure area.

7. The electronic device according to claim 6, wherein the method further comprises:
before receiving the request for the service,
configuring IP addresses deployed at the at least two infrastructure areas for a same domain name, to bind the same domain name with the IP addresses deployed at the at least two infrastructure areas.

8. The electronic device according to claim 6, wherein the method further comprises:
before receiving the request for the service,
configuring service instances of at least two infrastructure areas for each IP address, to bind the IP address to the identifiers of the service instances deployed at the at least two infrastructure areas.

9. The electronic device according to claim 6, wherein the method further comprises:
before receiving the request for the service,
configuring dependent services of at least two infrastructure areas for each service instance, to bind the identifier of the service instance to the identifiers of the dependent services deployed at the at least two infrastructure areas.

10. The electronic device according to claim 6, further comprising:
under the condition that a monitoring system detects that there is a service instance of the at least two service instances deployed at a faulty infrastructure area of the at least two infrastructure areas, unbinding the binding relationship between the IP addresses and the service instance deployed at the faulty infrastructure area; and scheduling traffic for the request for the service to a service instance of the at least two service instances deployed at an unfaulty infrastructure area of the at least two infrastructure areas, according to the binding relationship between the IP addresses and the service instance deployed at the unfaulty infrastructure area.

11. A non-transitory computer-readable storage medium storing computer instructions therein, wherein the computer instructions cause the computer to perform a method for disaster recovery processing for infrastructure areas, which comprises:
receiving a request for a service;

obtaining a domain name from the request for the service, wherein the domain name has binding relationships with a plurality of IP addresses, and wherein the plurality of IP addresses each has binding relationships with at least two service instances respectively deployed at at least two infrastructure areas, and the at least two service instances each has binding relationships with at least two IP addresses of the plurality of IP addresses;

under the condition that the monitoring system detects that there is a disabled IP address in the plurality of IP addresses, unbinding the disabled IP address from the domain name; and scheduling the traffic for the request to remaining IP address or addresses except for the disabled IP address, obtaining an identifier of a service instance from the request for the service, wherein the service instance has binding relationships with at least two dependent services respectively corresponding to at least two infrastructure areas;

under the condition that the monitoring system detects that there is a dependent service of the at least two dependent services deployed at a faulty infrastructure area of the at least two infrastructure areas, unbinding the dependent service deployed at the faulty infrastructure area from the service instance; and scheduling the traffic for the request for the service to the dependent service of the at least two dependent services deployed at an unfaulty infrastructure area of the at least two infrastructure areas, according to the binding relationship between the service instance and the dependent service deployed at the unfaulty infrastructure area.

12. The non-transitory computer-readable storage medium according to claim 11, wherein the method further comprises:
before receiving the request for the service,
configuring IP addresses deployed at the at least two infrastructure areas for a same domain name, to bind the same domain name with the IP addresses deployed at the at least two infrastructure areas.

13. The non-transitory computer-readable storage medium according to claim 11, wherein the method further comprises:
before receiving the request for the service,
configuring service instances of at least two infrastructure areas for each IP address, to bind the IP address to the identifiers of the service instances deployed at the at least two infrastructure areas.

14. The non-transitory computer-readable storage medium according to claim 11, wherein the method further comprises:
before receiving the request for the service,
configuring dependent services of at least two infrastructure areas for each service instance, to bind the identifier of the service instance to the identifiers of the dependent services deployed at the at least two infrastructure areas.

15. The non-transitory computer-readable storage medium according to claim 11, further comprising:
under the condition that a monitoring system detects that there is a service instance of the at least two service instances deployed at a faulty infrastructure area of the at least two infrastructure areas, unbinding the binding relationship between the IP addresses and the service instance deployed at the faulty infrastructure area; and
scheduling traffic for the request for the service to a service instance of the at least two service instances deployed at an unfaulty infrastructure area of the at least two infrastructure areas, according to the binding relationship between the IP addresses and the service instance deployed at the unfaulty infrastructure area.

* * * * *